(12) United States Patent
Army et al.

(10) Patent No.: US 9,784,126 B2
(45) Date of Patent: Oct. 10, 2017

(54) VARIABLE-SIZED COOLING AIR FLOW PATH

(71) Applicant: Hamilton Sundstrand Corporation, Windsor Locks, CT (US)

(72) Inventors: Donald E. Army, Enfield, CT (US); Christopher McAuliffe, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 9 days.

(21) Appl. No.: 14/968,269

(22) Filed: Dec. 14, 2015

(65) Prior Publication Data

US 2017/0167292 A1 Jun. 15, 2017

(51) Int. Cl.
| F01D 25/12 | (2006.01) |
| F16C 17/00 | (2006.01) |
| F16C 37/00 | (2006.01) |
| B64D 13/08 | (2006.01) |
| F16C 17/24 | (2006.01) |
| F01D 25/16 | (2006.01) |
| F16C 33/10 | (2006.01) |

(52) U.S. Cl.
CPC ........... F01D 25/125 (2013.01); B64D 13/08 (2013.01); F16C 17/243 (2013.01); F16C 37/00 (2013.01); *F01D 25/166* (2013.01); *F16C 33/1005* (2013.01)

(58) Field of Classification Search
CPC ........ F16C 17/10; F16C 17/243; F16C 33/02; F16C 33/1005; F16C 37/00; F16C 37/002; F01D 25/125; F01D 25/166; B64D 13/08

USPC ....... 384/109, 107, 121, 129, 278, 321, 448, 384/476, 478; 415/170.1, 405, 180; 62/406–407, 412, 408

See application file for complete search history.

(56) References Cited

U.S. PATENT DOCUMENTS 3,004,712 A * 10/1961 Noakes ................ G05D 23/185
  236/35
3,330,440 A * 7/1967 Summers ............ F16K 17/1626
  220/89.3
3,588,395 A * 6/1971 Hersey ................... H01H 35/34
  200/83 S (Continued)

FOREIGN PATENT DOCUMENTS

CA 1159030 A 12/1983
EP 547279 A1 * 6/1993 ............. F01D 25/16

(Continued)

OTHER PUBLICATIONS

Extended European Search Report for EP Application No. 16201699.2, dated May 23, 2017, 9 pages.

*Primary Examiner* — Marcus Charles
(74) *Attorney, Agent, or Firm* — Kinney & Lange, P.A.

(57) ABSTRACT

A cooling air flow path through an air cycle machine can include an inlet, at least one bearing downstream from the inlet and in fluidic connection with the inlet, an outlet downstream from the at least one bearing and in fluidic connection with the at least one bearing, and an adjustment device downstream from the at least one bearing and in fluidic connection with the at least one bearing and the outlet with the adjustment device configured to vary a flow of cooling air through the flow path by adjusting the cross-sectional area of the flow path.

19 Claims, 4 Drawing Sheets

(56) References Cited

U.S. PATENT DOCUMENTS

| | | | |
|---|---|---|---|
| 4,911,199 A * | 3/1990 | Bontenbal | E21B 34/08 137/460 |
| 5,025,642 A | 6/1991 | Brunskill et al. | |
| 5,113,670 A * | 5/1992 | McAuliffe | F01D 25/125 417/406 |
| 5,209,652 A * | 5/1993 | Fischer | F04D 29/041 384/103 |
| 5,309,735 A * | 5/1994 | Maher, Jr. | B64D 13/00 417/406 |
| 6,142,672 A | 11/2000 | Bently et al. | |
| 6,379,108 B1 | 4/2002 | Schmidt | |
| 7,948,105 B2 * | 5/2011 | Agrawal | F01D 15/005 290/52 |
| 8,100,586 B2 | 1/2012 | Ruggiero et al. | |
| 8,475,114 B2 * | 7/2013 | Rosen | F16C 3/02 29/889.1 |
| 8,496,533 B2 * | 7/2013 | Beers | B64D 13/06 384/321 |
| 8,790,066 B2 * | 7/2014 | Gutknecht | F01D 25/16 415/1 |
| 9,003,793 B2 * | 4/2015 | Begin | F02B 47/08 415/177 |
| 2003/0051475 A1 | 3/2003 | Allen et al. | |
| 2005/0210875 A1 * | 9/2005 | Larue | F16C 17/024 60/602 |
| 2012/0033904 A1 | 2/2012 | Gibson et al. | |
| 2013/0280043 A1 | 10/2013 | Parnin et al. | |
| 2013/0287555 A1 * | 10/2013 | Rosen | F04D 17/122 415/182.1 |
| 2014/0186161 A1 * | 7/2014 | Colson | F04D 17/122 415/170.1 |
| 2014/0199167 A1 * | 7/2014 | Beers | F04D 29/444 415/208.3 |
| 2015/0098814 A1 * | 4/2015 | Colson | B23P 19/10 415/213.1 |
| 2015/0275769 A1 | 10/2015 | Foutch et al. | |

FOREIGN PATENT DOCUMENTS

| | | | | |
|---|---|---|---|---|
| JP | 2004245193 A | * | 9/2004 | F01D 25/16 |
| JP | 2014173296 A | * | 9/2014 | E02F 9/00 |
| WO | WO-9946166 A1 | * | 9/1999 | B64D 13/08 |
| WO | WO2008/114185 A1 | | 9/2008 | |
| WO | 2013163045 A1 | | 10/2013 | |

* cited by examiner

VARIABLE-SIZED COOLING AIR FLOW PATH

BACKGROUND

The present disclosure relates to aircraft environmental control systems. More specifically, the present disclosure relates to a cooling air flow path to cool at least one bearing in an air cycle machine.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin.

Air cycle machines typically include rotating components mounted to a tie rod and a static housing surrounding the rotating components. A number of bearings can be used to keep the rotating components in place within the static housing. The bearings can be thrust bearings, journal bearings, and/or other bearings that can use foil, air, or both to support the rotating components. During operation, the bearings can experience elevated temperatures due to friction. If the temperature gets too high, the bearings can become damaged, reducing efficiency and possibly causing the air cycle machine to fail. Therefore, it is important to ensure the bearings remain at a sufficiently low temperature.

SUMMARY

A cooling air flow path through an air cycle machine can include an inlet, at least one bearing downstream from the inlet and in fluidic connection with the inlet, an outlet downstream from the at least one bearing and in fluidic connection with the at least one bearing, and an adjustment device downstream from the at least one bearing and in fluidic connection with the at least one bearing and the outlet with the adjustment device configured to vary a flow of cooling air through the flow path by adjusting the cross-sectional area of the flow path.

A method of cooling at least one bearing in an air cycle machine can include introducing cooling air into a cooling air flow path in an air cycle machine, directing cooling air adjacent to the at least one bearing, discharging cooling air from the cooling flow path through an outlet, and controlling an amount of cooling air flowing through the cooling air flow path depending on a temperature of the cooling air by adjusting the cross-sectional area of the cooling air flow path at a point adjacent to the outlet.

A cooling air flow path for an engine can include an inlet, at least one bearing downstream from the inlet, an outlet downstream from the at least one bearing, and an adjustment device adjacent to the outlet with the adjustment device configured to vary the flow of cooling air through the flow path by adjusting the cross-sectional area of the flow path.

The present summary is provided only by way of example and not limitation. Other aspects of the present disclosure will be appreciated in view of the entirety of the present disclosure, including the entire text, claims, and accompanying figures.

Figure 1:
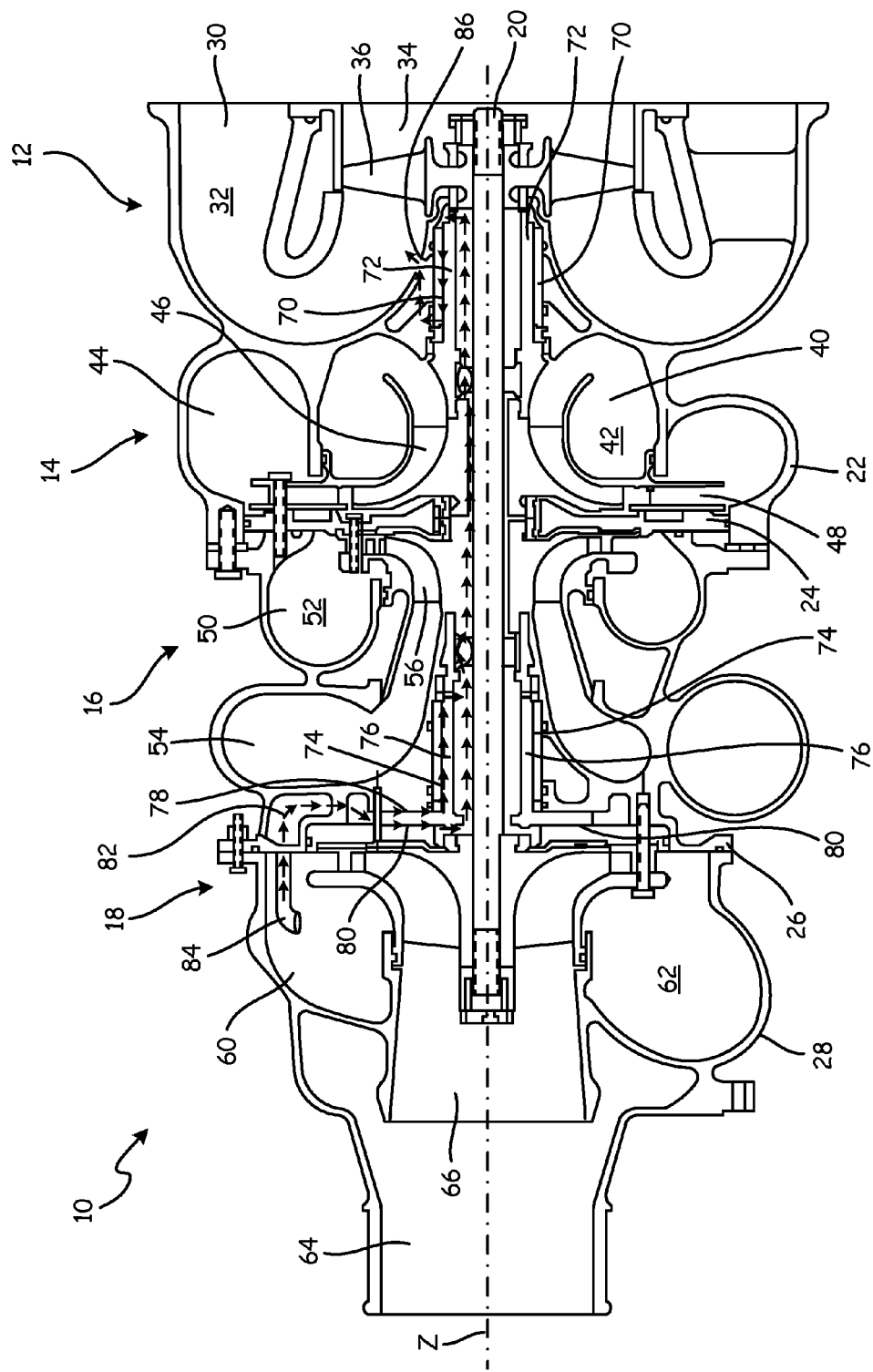
FIG. 1 is a cross-sectional view of an air cycle machine having two turbine sections.

While the above-identified figures set forth embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A cooling air flow path for cooling bearings in an air cycle machine is disclosed herein that includes an adjustment device to adjust the cross-sectional area of the cooling air flow path to vary the amount of cooling air flowing through the cooling air flow path. Because cooling air flow reduces the efficiency of the air cycle machine but is necessary to prevent damage to bearings within the air cycle machine and increase the capacity of the air cycle machine, the amount of cooling air flowing through the cooling air flow path is adjusted so that only the amount necessary to cool the bearings is provided. The cooling air can be varied using a passive adjustment device or an active adjustment device that adjusts the cross-sectional area of the cooling air flow path depending on the temperature of the cooling air exiting the cooling air flow path, with the temperature of the cooling air exiting the cooling air flow path indicative of the temperature of the bearings intended to be cooled along the cooling air flow path. The passive adjustment device can be one thermally dependent snap disc, multiple thermally dependent snap discs stacked in a series, a wax thermal actuator, or another component that adjusts the flow path cross-sectional area without active inputs. The active adjustment device can include an actuator and an electronic controller that receives temperature data from a temperature sensor at a point along the cooling air flow path and adjusts the flow path cross-sectional area depending on the temperature of the cooling air exiting the cooling air flow path. The adjustment device may be positioned near the outlet so that the pressure drop of the cooling air caused by the adjustment device does not affect other components along the cooling air flow path.

FIG. 1 is a cross-sectional view of air cycle machine 10 having two turbine sections (a two stage air cycle machine), which includes fan section 12, compressor section 14, first turbine section 16, second turbine section 18, tie rod 20, fan and compressor housing 22, seal plate 24, first turbine housing 26, and second turbine housing 28. Also shown in FIG. 1 is axis Z.

Fan section 12, compressor section 14, first turbine section 16, and second turbine section 18 are all mounted on tie rod 20. Tie rod 20 rotates about axis Z. Fan and compressor housing 22 is connected to seal plate 24 and first turbine housing 26 with fasteners. Seal plate 24 separates flow paths in fan and compressor housing 22 from flow paths in first turbine housing 26. First turbine housing 26 is connected to second turbine housing 28 with fasteners. Fan and compressor housing 22, first turbine housing 26, and second turbine housing 28 together form an overall housing for air cycle machine 10. Fan and compressor housing 22 houses fan section 12 and compressor section 14, first turbine housing 26 houses first turbine section 16, and second turbine housing 28 houses second turbine section 18.

Fan section 12 includes fan inlet 30, fan duct 32, fan outlet 34, and fan rotor 36. Fan section 12 typically draws in ram air from a ram air scoop or alternatively from an associated gas turbine or other aircraft component. Air is drawn into fan inlet 30 and is ducted through fan duct 32 to fan outlet 34. Fan rotor 36 is positioned in fan duct 32 adjacent to fan outlet 34 and is mounted to and rotates with tie rod 20. Fan rotor 36 draws air into fan section 12 to be routed through air cycle machine 10.

Compressor section 14 includes compressor inlet 40, compressor duct 42, compressor outlet 44, compressor rotor 46, and diffuser 48. Air is routed into compressor inlet 40 and is ducted through compressor duct 42 to compressor outlet 44. Compressor rotor 46 and diffuser 48 are positioned in compressor duct 42. Compressor rotor 46 is mounted to and rotates with tie rod 20 to compress the air flowing through compressor duct 42. Diffuser 48 is a static structure through which the compressor air can flow after it has been compressed with compressor rotor 46. Air exiting diffuser 48 can then exit compressor duct 42 through compressor outlet 44.

First turbine section 16 includes first turbine inlet 50, first turbine duct 52, first turbine outlet 54, and first turbine rotor 56. Air is routed into first turbine inlet 50 and is ducted through first turbine duct 52 to first turbine outlet 54. First turbine rotor 56 is positioned in first turbine duct 52 and is mounted to and rotates with tie rod 20. First turbine rotor 56 will extract energy from the air passing through first turbine section 16 to drive rotation of tie rod 20.

Section turbine section 18 includes second turbine inlet 60, second turbine duct 62, second turbine outlet 64, and second turbine rotor 66. Air is routed into second turbine inlet 60 and is ducted through second turbine duct 62 to second turbine outlet 64. Second turbine rotor 66 is positioned in second turbine duct 62 and is mounted to and rotates with tie rod 20. Second turbine rotor 66 will extract energy from the air passing through second turbine section 18 to drive rotation of tie rod 20.

Air cycle machine 10 further includes first journal bearing 70, first rotating shaft 72, second journal bearing 74, second rotating shaft 76, first thrust bearing 78, and second thrust bearing 80. First journal bearing 70 is positioned in fan section 12 and is supported by fan and compressor housing 22. First rotating shaft 72 extends between and rotates with fan rotor 36 and compressor rotor 46. A radially outer surface of first rotating shaft 72 abuts a radially inner surface of first journal bearing 70. Second journal bearing 74 is positioned in first turbine section 16 and is supported by first turbine housing 26. Second rotating shaft 76 extends between and rotates with first turbine rotor 56 and second turbine rotor 66. A radially outer surface of second rotating shaft 76 abuts a radially inner surface of second journal bearing 74. First thrust bearing 78 is positioned in first turbine section 16, is supported by first turbine housing 26, and prevents tie rod 20 and second rotating shaft 76 from moving axially toward fan section 12. Second thrust bearing 80 is positioned in second turbine section 18, is supported by first turbine housing 26, and prevents tie rod 20 and second rotating shaft 76 from moving axially toward second turbine section 18.

Air cycle machine 10 includes cooling air flow path 82 shown by arrows in FIG. 1. Cooling air enters cooling air flow path 82 at cooling air inlet 84, which is located within second turbine section 18 and, more specifically, adjacent to second turbine inlet 60. Cooling air then proceeds through first thrust bearing 78 and second thrust bearing 80 before flowing through second journal bearing 74 to cool those components. Flow path 82 then continues along tie rod 20 to first journal bearing 70, where cooling air cools first journal bearing 70 before exiting out cooling air outlet 86. Cooling air outlet 86 opens into fan duct 32, which then takes the cooling air out of air cycle machine 10 through fan outlet 34. Other configurations of cooling air flow path 82 can be present within air cycle machine 10 to cool first journal bearing 70, second journal bearing 74, first cycle machine 10 includes adjustment device 88 along cooling air flow path 82 and electronic controller 90 (which may not be present in other embodiments) adjacent air cycle machine 10 configured to modify the operation of air cycle machine 10 depending on a temperature of the cooling air flowing through cooling air flow path 82. Cooling air flow path 82 can include other components to vary the amount of cooling air flowing through cooling air flow path 82 to provide more or less cooling capacity to increase efficiency of air cycle machine 10.

Figure 2:
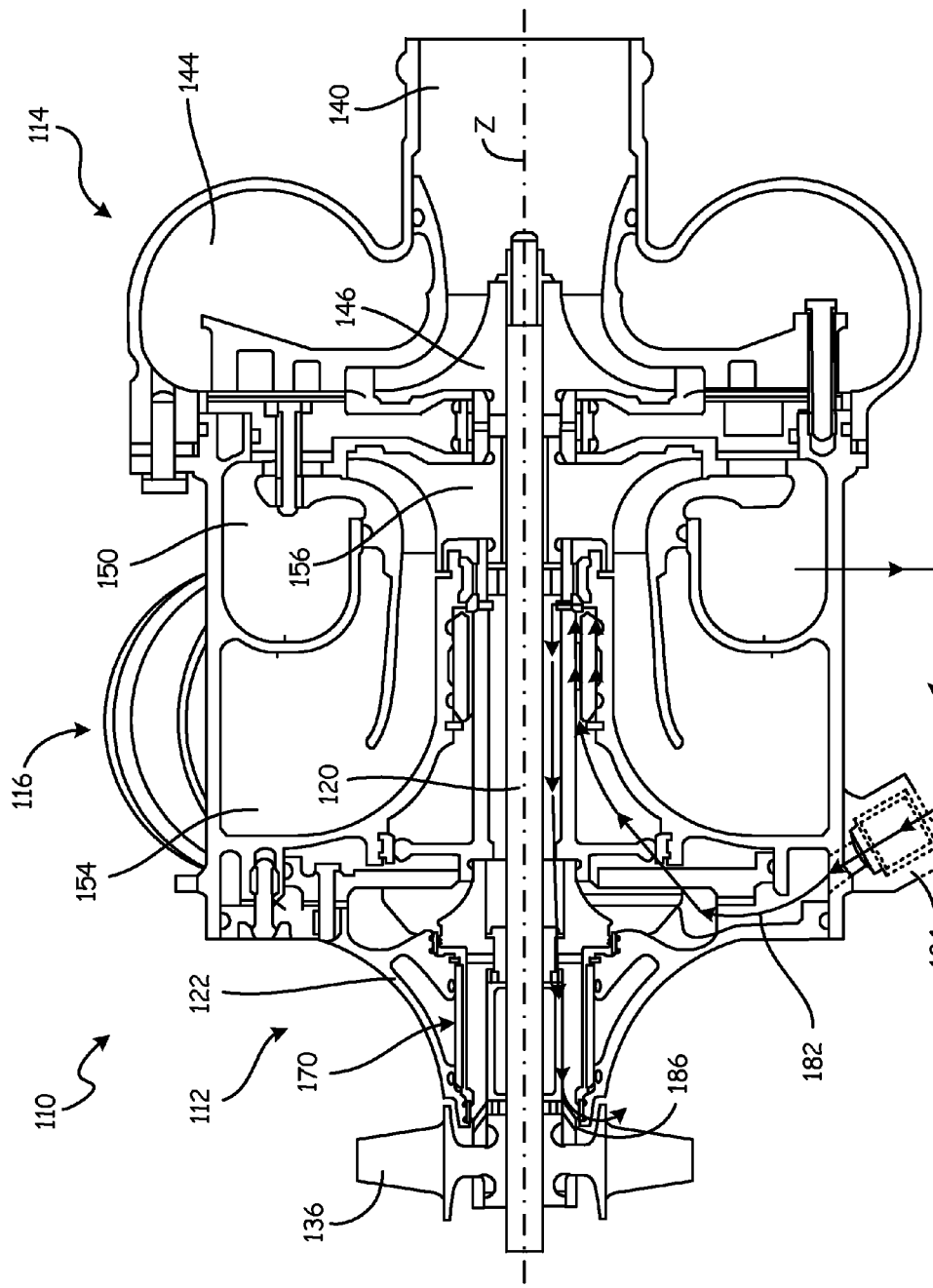
FIG. 2 is a cross-sectional view of an air cycle machine having one turbine section.

FIG. 2 is a cross-sectional view of air cycle machine 110 having only one turbine section (a single stage air cycle machine), which includes fan section 112, compressor section 114, turbine section 116, tie rod 120, and housing 122. Tie rod 120 rotates around central axis Z. Fan section 112, compressor section 114, and turbine section 116 are all mounted on tie rod 120. Fan section 112 includes fan rotor 136 and journal bearing 170. Compressor section 114 includes compressor inlet 140, compressor outlet 144, and compressor rotor 146. Turbine section 116 includes turbine inlet 150, turbine outlet 154, and turbine rotor 156. Air cycle machine 110 of FIG. 2 functions similarly to air cycle machine 10 of FIG. 1 except that air cycle machine 110 only has one turbine section 116 and cooling air flow path 182 has a slightly different path through air cycle machine 110.

Air cycle machine 110 includes cooling air flow path 182 shown by arrows in FIG. 2. Cooling air enters cooling air flow path 182 at cooling air inlet 184, which is located within turbine section 116. The cooling air can be bled from turbine inlet 150 or come from another source, such as ram air from a ram air scoop or alternatively from an associated gas turbine or other aircraft component. Cooling air then proceeds through journal bearing 170 to cool journal bearing 170 before exiting out cooling air outlet 186. Cooling air outlet 186 is located within fan section 112. Other configurations of cooling air flow path 182 can be present within air cycle machine 110 to cool journal bearing 170 and other components. As will be described below, air cycle machine 110 includes adjustment device 188 along cooling air flow path 182 and electronic controller 190 (which may not be present in other embodiments) adjacent air cycle machine 110 configured to modify the operation of air cycle machine 110 depending on a temperature of the cooling air flowing through amount of cooling air flowing through cooling air flow path 182 to provide more or less cooling capacity to increase efficiency of air cycle machine 110.

Figure 3A:
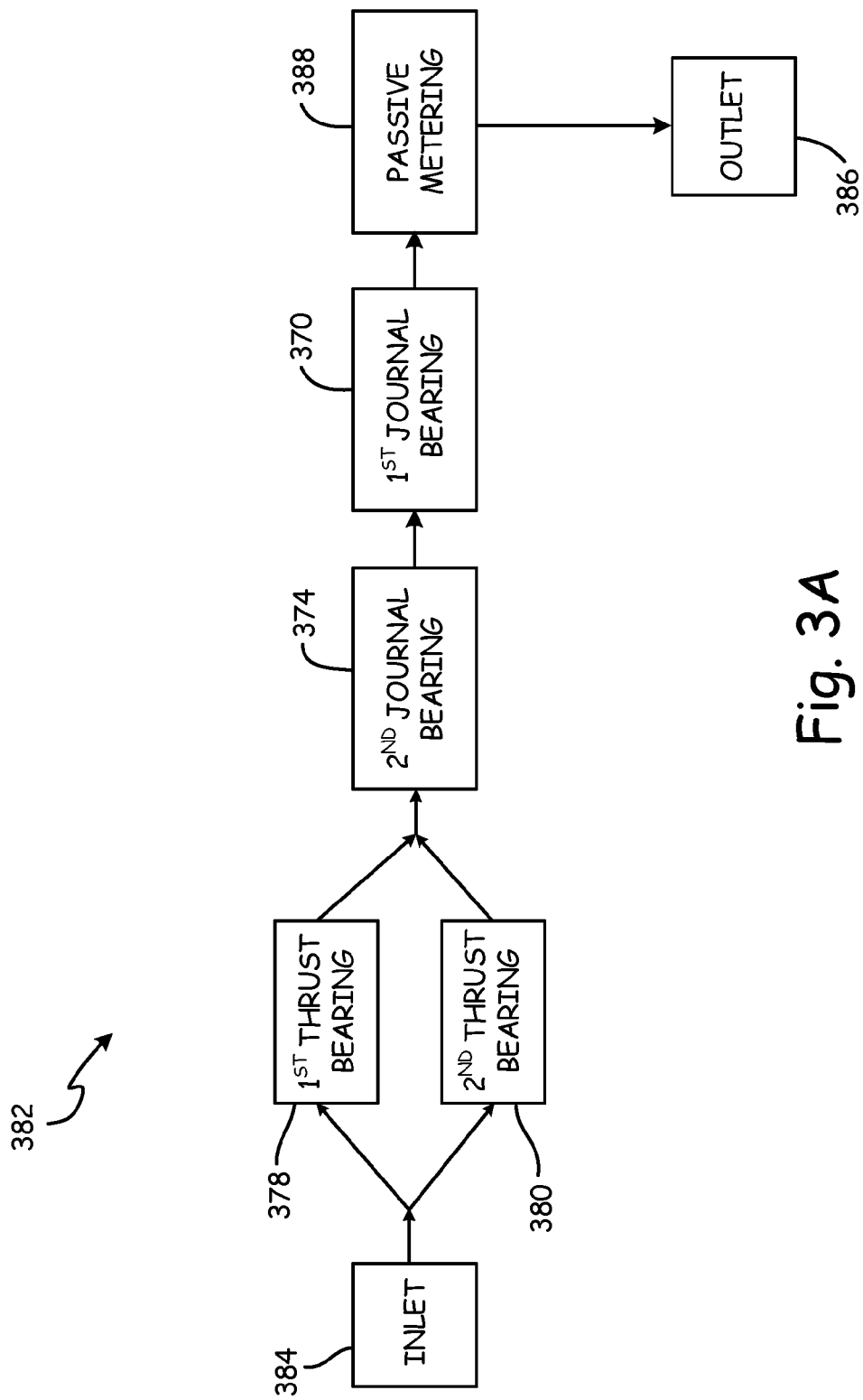
FIG. 3A is a schematic of one embodiment of a cooling air flow path.

FIG. 3A is a schematic of one embodiment of a cooling air flow path. Cooling air flow path 382 includes cooling air inlet 384, first thrust bearing 378, second thrust bearing 380, second journal bearing 374, first journal bearing 370, passive adjustment device 388, and cooling air outlet 386. Cooling air flow path 382 can be incorporated into an air cycle machine having one, two, or more turbine sections or other engines that require cooling of internal components.

As discussed briefly with regards to FIGS. 1 and 2, cooling air enters cooling air flow path 382 through cooling air inlet 384, which is an orifice that can be connected to a cool high pressure source or alternatively from an associated gas turbine or other aircraft component. Cooling air inlet 384 should be sized such that cooling air can easily enter cooling air flow path 382 without resistance (passive adjustment device 388 will provide resistance to adjust the amount of cooling air entering cooling air flow path 382). Cooling air inlet 384 can have a filter to ensure the cooling air entering cooling air flow path 382 is free from particulates and impurities, or some other filtration system can be in place to filter the cooling air before it arrives at cooling air inlet 384. Cooling air inlet 384 can be placed in a variety of positions and locations around the air cycle machine, but should configured to guide cooling air to first thrust bearing 378 and second thrust bearing 380 along cooling air flow path 382.

Downstream from cooling air inlet 384 are first thrust bearing 378 and second thrust bearing 380, which are known in the art and can be air bearings that prevent the tie rod or another shaft from axial movement. During operation of the air cycle machine, first thrust bearing 378 and second thrust bearing 380 can experience elevated temperature due to friction. This friction can cause the components of first thrust bearing 378 and/or second thrust bearing 380, such as a foil, to become damaged. Damage to first thrust bearing 378 and/or second thrust bearing 380 can reduce the efficiency of the air cycle machine or cause the air cycle machine to fail and halt operation. Therefore, it is important that the cooling air flowing through cooling air flow path 382 keeps first thrust bearing 378 and second thrust bearing 380 at a suitable temperature.

Downstream from first thrust bearing 378 and second thrust bearing 380 are second journal bearing 374 and first journal bearing 370 in series, which are known in the art and can be air bearings that support the tie rod or another shaft radially. Similar to first thrust bearing 378 and second thrust bearing 380, first journal bearing 370 and second journal bearing 374 can experience elevated temperature during operation due to friction between the tie rod or another shaft and the components of first journal bearing 370 and second journal bearing 374, respectively. This friction can cause damage, which can reduce the efficiency of the air cycle machine or cause the air cycle machine to fail and halt operation. To keep first journal bearing 370 and second journal bearing 374 at a suitable temperature, the cooling air flows through the bearings and around the components of the bearings. While the air cycle machine can have a number of configurations, FIG. 3A shows a configuration in which cooling air first flows through second journal bearing 374 and then through first journal bearing 370. Increasing the amount of cooling air flowing through cooling air flow path 382 (and passed the bearings) increases the capacity of the bearings, allowing the air cycle machine to operate at increased levels.

Passive adjustment device 388 can be downstream from the bearings in the air cycle machine and adjacent to cooling air outlet 386. Passive adjustment device 388 adjusts the cross-sectional area of cooling air flow path 382 to vary the amount of cooling air flowing through cooling air flow path 382 (and flowing adjacent to first thrust bearing 378, second thrust bearing 380, second journal bearing 374, and first thrust bearing 370). Passive adjustment device 388 is in control of the cross-sectional area of cooling air flow path 382 to create a choke point along cooling air flow path 382. An increase in the cross-sectional area of cooling air flow path 382 by passive adjustment device 388 allows more cooling air to flow through cooling air flow path 382, thereby increasing the capacity of the air cycle machine and decreasing the temperature of the bearings. Conversely, a decrease in the cross-sectional area of cooling air flow path 382 by passive adjustment device 388 (creating a more restrictive choke point) reduces the amount of cooling air that can flow through cooling air flow path 382, thereby decreasing capacity of the air cycle machine but increasing the efficiency. Passive adjustment device 388 can have a number of configurations, including one thermally dependent snap disc, multiple thermally dependent snap discs stacked in a series, a wax thermal actuator, or another component that adjusts the outlet cross-sectional area without active inputs. A thermally dependent snap disc, multiple thermally dependent snap discs stacked in a series, and a wax thermal actuator are well known to those of skill in the art for use in other systems but not for adjusting the cross-sectional area of cooling air flow path 382 in the disclosed embodiments. Each of these is discussed in detail below but would be known by those of skill in the art.

Passive adjustment device 388 can preferably be located near cooling air outlet 386, and not near cooling air inlet 384, to avoid a large pressure drop at cooling air inlet 384 which results along cooling air flow path 382 after the choke point created by passive adjustment device 388. If passive adjustment device 388 was located at cooling air inlet 384, a pressure drop would occur at cooling air inlet 384 (i.e., at the beginning of cooling air flow path 382), thereby affecting the cooling capacity of cooling air flow path 382. Because the cooling air will increase in temperature after it is used to cool the bearings, passive adjustment device 388 should preferably be located downstream from the bearings so that the passive adjustment device 388 adjusts the cross-sectional area of cooling air flow path 382 in response to the increase in temperature of the cooling air caused by the bearings.

The thermally dependent snap disc would "snap" between a location that blocks a portion of the cross-sectional area of cooling air flow path 382 (when the temperature of the cooling air is less than a specific temperature) and a location that does not block any portion of the cross-sectional area of cooling air flow path 382 (when the temperature of the cooling air is greater than a specific temperature). The thermally dependent snap disc would provide a step increase or decrease in cooling air flow when needed in response to elevated or decreased temperature of the cooling air flowing through cooling air flow path 382 to increase the capacity of the bearings and prevent damage to the bearings or to decrease the cooling air flow to increase efficiency of the air cycle machine. The thermally dependent snap disc can be a bimetallic snap disc with metals chosen to "snap" at a desired temperature that corresponds with a temperature of the cooling air at which increased cooling air flow or decreased cooling air flow as desired.

The multiple thermally dependent snap discs stacked in series would not "snap" between two locations but rather deform gradually between a location that blocks a portion of the cross-sectional area of cooling air flow path 382 (when the temperature of the cooling air is less than a first specific temperature) and a location that does not block any portion of the cross-sectional area of cooling air flow path 382 (when the temperature of the cooling air is greater than a second, different specific temperature). The multiple thermally dependent snap discs can be bimetallic snap discs that would be in contact with and adjacent to one another with adjacent snap discs being configured to proportionally deflect at higher temperatures, causing the entire stack of thermally dependent snap discs to slowly deform between the two locations as the temperature of the cooling air changes. The multiple thermally dependent snap discs stacked in series would provide a linear increase/decrease in cooling air flow through cooling air flow path 382 when needed in response to elevated or decreased temperature of the cooling air to increase the capacity of the bearings or to decrease the cooling air flow to increase efficiency of the air cycle machine. The multiple thermally dependent snap discs stacked in series can be configured to deform so as to increase cooling air flow or decrease cooling air flow as desired.

The wax thermal actuator can be configured to melt and solidify such that when the wax is melted the wax thermal actuator does not block any portion of the cross-sectional area of cooling air flow path 382 (when the temperature of the cooling air is greater than a first specific temperature) and when the wax is solid the wax thermal actuator blocks a portion of the cross-sectional area of cooling air flow path 382 (when the temperature of the cooling air is less than a second, different specific temperature). The wax thermal actuator can be configured such that the wax thermal actuator would provide a linear increase/decrease in cooling air flow because the wax would slowly melt or solidify depending on the temperature of the cooling air flowing through cooling air cooling air flow path 382. The wax thermal actuator would increase or decrease cooling air flow when needed in response to elevated temperature (which would melt the wax) to increase the capacity of the bearings or decreased temperature (which would allow the wax to solidify) decrease the cooling air flow to increase efficiency of the air cycled machine.

Downstream from passive adjustment device 388 is cooling air outlet 386, which allows cooling air to exit cooling air flow path 382 into the environment. Cooling air outlet 386 can be a variety of configurations and locations, but should be configured to allow cooling air to exit cooling air flow path 382 without any resistance in addition to the resistance provided by passive adjustment device 388.

As mentioned above, passive adjustment device 388 does not require electrical inputs or any other inputs to instruct passive adjustment device 388 to increase or decrease the amount of cooling air flowing through cooling air flow path 382. The lack of need of electricity and computing associated with passive adjustment device 388 may be desired in many circumstances, such as when running electricity and/or wires to passive adjustment device 388 is difficult. Passive adjustment device 388 varies the amount of cooling air flowing through cooling air flow path 382 depending on the temperature of the cooling air at a point along cooling air flow path 382 where passive adjustment device 388 is located, preferably near cooling air outlet 386. Passive adjustment device 388; whether one thermally dependent snap disc, multiple thermally dependent snap discs stacked in series, a wax thermal actuator, or another passive device; varies the amount of cooling air flowing through cooling air flow path 382 so that only the amount necessary to cool the bearings is provided to improve the efficiency of the air cycle machine and prevent damage to the bearings. Air cooling flow path 382 can have a number of other configurations that includes cooling air inlet 384 in a different location, any number and type of bearings, and cooling air outlet 386 in a different location.

Figure 3B:
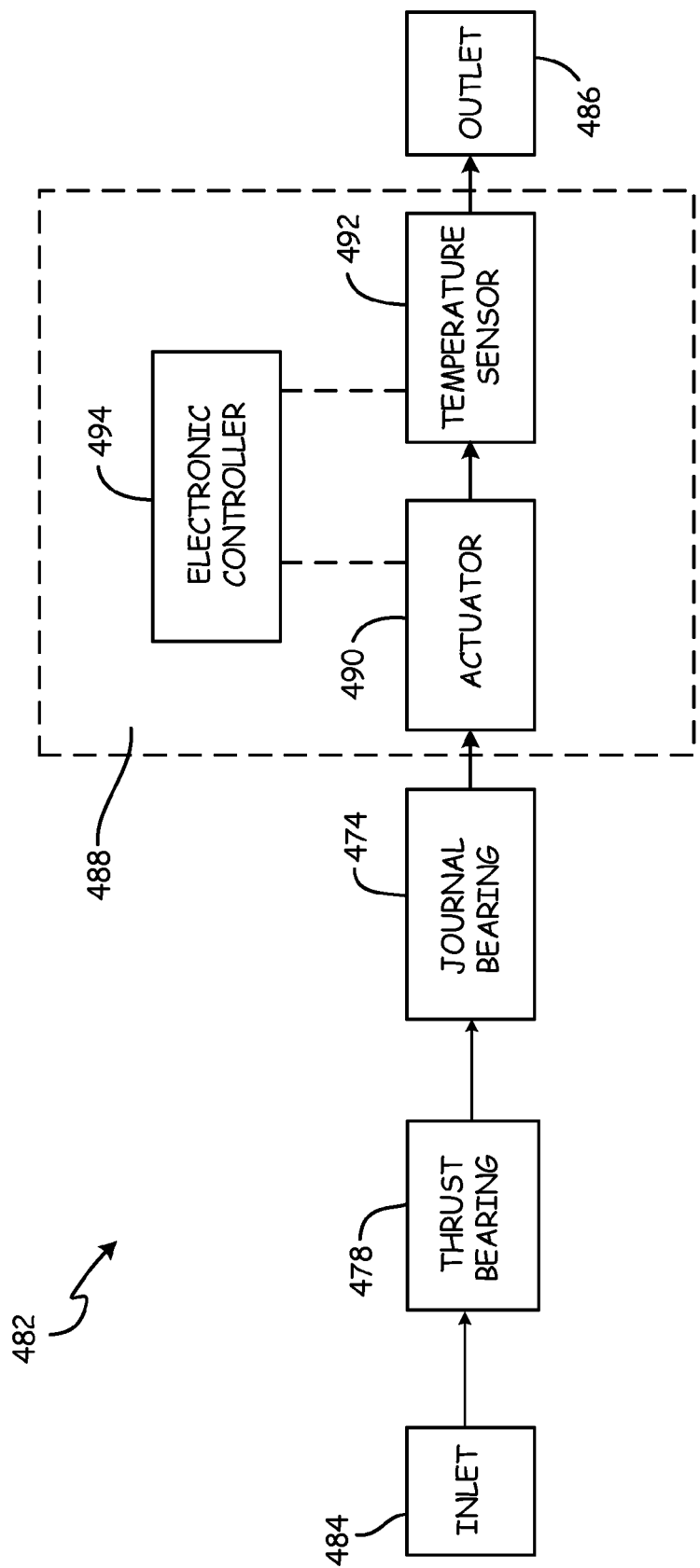
FIG. 3B is a schematic of another embodiment of a cooling air flow path.

FIG. 3B is a schematic of another embodiment of a cooling air flow path. Cooling air flow path 482 includes cooling air inlet 484, thrust bearing 478, journal bearing 474, active adjustment device 488 (which includes actuator 490, temperature sensor 492, and electronic controller 494), and cooling air outlet 486. Cooling air flow path 482 is similar in function and purpose as cooling air flow path 382 of FIG. 3A, but with differences in the number of bearings and the use of active adjustment device 488 to actively vary the amount of cooling air flowing through cooling air flow path 482. Cooling air flow path 482 can be incorporated into an air cycle machine having one, two, or more turbine sections or other engines that require cooling of internal components.

Cooling air inlet 484, thrust bearing 478, and journal bearing 474 are similar to those components in cooling air flow path 382. However, cooling air flow path 482 includes only one of each of thrust bearing 478 and journal bearing 474. Additionally, while FIG. 3B shows only one of thrust bearing 478 and journal bearing 474 with thrust bearing 478 being upstream from journal bearing 474, other configurations can include any number of bearings in any orientation and/or order. Cooling air enters cooling air flow path 482 through cooling air inlet 484 and flows to thrust bearing 478 and journal bearing 474 to cool thrust bearing 478 and journal bearing 474.

Downstream from thrust bearing 478 and journal bearing 474 is active adjustment device 488; which includes actuator 490, temperature sensor 492, and electronic controller 494; and can be adjacent to cooling air outlet 486. Active adjustment device 488 is an active system that measures temperature data and adjusts the cross-sectional area of cooling air flow path 482 to increase or decrease the amount of cooling air flowing through cooling air flow path 482 (for the reasons discussed in regard to cooling air flow path 382 in FIG. 3A). Active adjustment device 488 is active (as opposed to passive adjustment device 388) because temperature sensor 492 actively measures a temperature of the cooling air flowing through cooling air flow path 482, conveys that temperature data to electronic controller 494, and electronic controller 494 instructs actuator 490 to increase or decrease the cross-sectional area of cooling air flow path 482 depending on the temperature data.

Actuator 490 can be any device able to receive instruction from electronic controller 494 and increase or decrease the cross-sectional area of cooling air flow path 482, such as a torque motor, a motor and piston, or a specific or general purpose actuator and plug.

Temperature sensor 492 is any sensor that is able to measure the temperature of the cooling air and convey that temperature data to electronic controller 494. Temperature sensor 492 can be located anywhere along cooling air flow path 482 but should be located downstream from journal bearing 474 to get an accurate reading of the cooling air temperature after the cooling air has been used to cool the bearings. Temperature sensor 492 should be able to measure relatively high temperatures and preferably is a resistance temperature detector.

Electronic controller 494 of active adjustment device 488 receives temperature data from temperature sensor 492 and instructs actuator 490 to increase or decrease the cross-sectional area of cooling air flow path 482. Electronic controller 494 can be a stand-alone computer processor or other electronic component that is locally located near actuator 490 and temperature sensor 492 (near the air cycle machine) or can be contained near or within an engine control unit or other master computer system such that electronic controller 494 is separate from the air cycle machine (i.e., separate from actuator 490 and temperature sensor 492). Electronic controller 494 should include a logic that determines if/when the cross-sectional area of cooling air flow path 482 should be increased or decreased depending on the temperature data of the cooling air provided to electronic controller 494 by temperature sensor 492. Additionally, electronic controller 494 can record and store the temperature data provided by temperature sensor 492 to electronic controller 494 for use in air cycle machine performance analysis, such as engine health monitoring and fault diagnosis. The temperature data can be useful in determining whether the bearings within cooling air flow path 482 have deteriorated or are deteriorating over time to be able to accurately determine the efficiency of the air cycle machine and when maintenance is needed.

As mentioned above, active adjustment device 488 actively measures the temperature of the cooling air flowing through cooling air flow path 482 and utilizes that data to increase or decrease the amount of cooling air flowing through cooling air flow path 482 by adjusting the cross-sectional area of cooling air flow path 482. An active system may be advantageous because more accurate measurement of temperature data may be desired for improved efficiency and further air cycle machine performance analysis. Electronic controller 494 receives temperature data from temperature sensor 492 and, depending on the temperature data, instructs actuator 490 to increase or decrease the cross-sectional area of cooling air flow path 482 (which in turn increases or decreases the amount of cooling air flowing to cool thrust bearing 478 and journal bearing 474). Air cooling flow path 482 can have a number of other configurations that includes cooling air inlet 484 in a different location, any number and type of bearings, and cooling air outlet 486 in a different location.

Passive adjustment device 388 in cooling air flow path 382 in FIG. 3A and active adjustment device 488 in cooling air flow path 482 in FIG. 3B can be utilized in any type of engine that requires cooling air to cool engine components, not just an air cycle machine.

Discussion of Possible Embodiments

The following are non-exclusive descriptions of possible embodiments of the present invention.

A cooling air flow path through an air cycle machine includes an inlet, at least one bearing downstream from the inlet and in fluidic connection with the inlet, an outlet downstream from the at least one bearing and in fluidic connection with the at least one bearing, and an adjustment device downstream from the at least one bearing and in fluidic connection with the at least one bearing and the outlet with the adjustment device configured to vary a flow of cooling air through the flow path by adjusting the cross-sectional area of the flow path.

The cooling air flow path of the preceding paragraph can optionally include, additionally and/or alternatively, any one or more of the following features, configurations, and/or additional components:

The adjustment device is a temperature-sensitive snap disc.

The adjustment device is a wax thermal actuator.

The adjustment device is multiple temperature-sensitive snap discs stacked in series.

The multiple temperature-sensitive snap discs are bimetallic snap discs in contact with one another.

A temperature sensor at a point along the flow path and an electronic controller electrically connected to the temperature sensor to receive temperature sensor data.

The adjusting device is an actuator in electrical connection with the electronic controller and configured to adjust the cross-sectional area of the flow path as instructed by the electronic controller.

The actuator is a torque motor.

The electronic controller is able to record and store temperature data for use in air cycle machine performance analysis.

The at least one bearing includes a thrust bearing and a journal bearing.

A method of cooling at least one bearing in an air cycle machine includes introducing cooling air into a cooling air flow path in an air cycle machine, directing cooling air adjacent to the at least one bearing, discharging cooling air from the cooling flow path through an outlet, and controlling an amount of cooling air flowing through the cooling air flow path depending on a temperature of the cooling air by adjusting the cross-sectional area of the cooling air flow path at a point adjacent to the outlet.

The method of the preceding paragraph can optionally include, additionally and/or alternatively, any one or more of the following features, configurations, steps, and/or additional components:

The step of controlling an amount of cooling air flowing through the cooling air flow path includes adjusting the cross-sectional area of the cooling air flow path by a temperature-sensitive snap disc.

Measuring the temperature of the cooling air by a temperature sensor and adjusting the cross-sectional area of the cooling air flow path by an actuator depending on a measurement of the temperature.

Measuring the temperature of the cooling air by a temperature sensor and recording and storing a measurement of the temperature by an electronic controller for use in air cycle machine performance analysis.

Increasing the amount of cooling air flowing through the cooling air flow path when the temperature of the cooling air is greater than a desired temperature and decreasing the amount of cooling air flowing through the cooling air flow path when the temperature of the cooling air is less than a desired temperature.

A cooling air flow path for an engine includes an inlet, at least one bearing downstream from the inlet, an outlet downstream from the at least one bearing, and an adjustment device adjacent to the outlet with the adjustment device configured to vary the flow of cooling air through the flow path by adjusting the cross-sectional area of the flow path.

The cooling air flow path of the preceding paragraph can optionally include, additionally and/or alternatively, any one or more of the following features, configurations, and/or additional components:

The adjustment device is a temperature-sensitive snap disc.

The adjustment device is multiple temperature-sensitive snap discs stacked in series.

A temperature sensor to measure the temperature of the cooling air flowing through the flow path and an electronic controller electrically connected to the temperature sensor to receive temperature sensor data, wherein the adjustment device is an actuator that is electrically connected to the electronic controller and is configured to adjust the cross-sectional area of the flow path as instructed by the electronic controller.

The actuator is a torque motor.

Any relative terms or terms of degree used herein, such as "substantially," "essentially," "generally," "approximately," and the like should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations; incidental alignment variations; alignment or shape variations induced by thermal, rotational, or vibrational operational conditions; and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A cooling air flow path through an air cycle machine, the flow path comprising:
   an inlet;
   at least one bearing downstream from the inlet and in fluidic connection with the inlet;
   an outlet downstream from the at least one bearing and in fluidic connection with the at least one bearing; and
   an adjustment device downstream from the at least one bearing and in fluidic connection with the at least one bearing and the outlet, the adjustment device configured to vary a flow of cooling air through the flow path by adjusting the cross-sectional area of the flow path during operation of the air cycle machine.

2. The flow path of claim 1, wherein the adjustment device is a temperature-sensitive snap disc.

3. The flow path of claim 1, wherein the adjustment device is a wax thermal actuator.

4. The flow path of claim 1, wherein the adjustment device is multiple temperature-sensitive snap discs stacked in series.

5. The flow path of claim 4, wherein the multiple temperature-sensitive snap discs are bimetallic snap discs in contact with one another.

6. The flow path of claim 1, further comprising:
   a temperature sensor at a point along the flow path; and
   an electronic controller electrically connected to the temperature sensor to receive temperature sensor data.

7. The flow path of claim 6, wherein the adjusting device is an actuator in electrical connection with the electronic controller and configured to adjust the cross-sectional area of the flow path as instructed by the electronic controller.

8. The flow path of claim 7, wherein the actuator is a torque motor.

9. The flow path of claim 6, wherein the electronic controller is able to record and store temperature data for use in a performance analysis of the air cycle machine.

10. The flow path of claim 1, wherein the at least one bearing includes a thrust bearing and a journal bearing.

11. A method of cooling at least one bearing in an air cycle machine, the method comprising:
   introducing cooling air into a cooling air flow path in the air cycle machine;
   directing cooling air adjacent to the at least one bearing;
   discharging cooling air from the cooling flow path through an outlet; and
   controlling an amount of cooling air flowing through the cooling air flow path depending on a temperature of the cooling air by adjusting the cross-sectional area of the cooling air flow path at a point adjacent to the outlet.

12. The method of claim 11, wherein the step of controlling an amount of cooling air flowing through the cooling air flow path comprises:
   adjusting the cross-sectional area of the cooling air flow path by a temperature-sensitive snap disc.

13. The method of claim 11, further comprising:
   measuring the temperature of the cooling air by a temperature sensor; and
   adjusting the cross-sectional area of the cooling air flow path by an actuator depending on a measurement of the temperature.

14. The method of claim 11, further comprising:
   measuring the temperature of the cooling air by a temperature sensor; and
   recording and storing a measurement of the temperature by an electronic controller for use in a performance analysis of the air cycle machine.

15. The method of claim 11, further comprising:
   increasing the amount of cooling air flowing through the cooling air flow path when the temperature of the cooling air is greater than a desired temperature; and
   decreasing the amount of cooling air flowing through the cooling air flow path when the temperature of the cooling air is less than a desired temperature.

16. The method of claim 11, wherein the step of controlling an amount of cooling air flowing through the cooling air flow path comprises:
   adjusting the cross-sectional area of the cooling air flow path by multiple temperature-sensitive snap discs stacked in series.

17. A cooling air flow path for an engine, the flow path comprising:
   an inlet;
   at least one bearing downstream from the inlet;
   an outlet downstream from the at least one bearing;
   a temperature sensor configured to measure the temperature of the cooling air flowing through the flow path;
   an electronic controller electrically connected to the temperature sensor to receive temperature sensor data; and
   an adjustment device electrically connected to the electronic controller and adjacent to the outlet, the adjustment device being an actuator configured to vary the flow of cooling air through the flow path by adjusting the cross-sectional area of the flow path as instructed by the electronic controller.

18. The path of claim 17, wherein the actuator is a torque motor.

19. The method of claim 11, wherein the step of controlling an amount of cooling air flowing through the cooling air flow path comprises:
   adjusting the cross-sectional area of the cooling air flow path by a wax thermal actuator.

* * * * *

UNITED STATES PATENT AND TRADEMARK OFFICE
CERTIFICATE OF CORRECTION

| | | |
|---|---|---|
| PATENT NO. | : 9,784,126 B2 | Page 1 of 1 |
| APPLICATION NO. | : 14/968269 | |
| DATED | : October 10, 2017 | |
| INVENTOR(S) | : Donald E. Army and Christopher McAuliffe | |

It is certified that error appears in the above-identified patent and that said Letters Patent is hereby corrected as shown below:

Column 4, Line 23:
Delete "bearing 70, second journal bearing 74, first cycle machine 10"
Insert -- bearing 70, second journal bearing 74, first thrust bearing 78, second thrust bearing 80, and other components. As will be described below, air cycle machine 10 --

Column 4, Line 67:
Delete "depending on a temperature of the cooling air flowing through amount of cooling air flowing through cooling air flow path 182 to provide more or less cooling capacity"
Insert -- depending on a temperature of the cooling air flowing through cooling air flow path 182. Cooling air flow path 82 can include other components to vary the amount of cooling air flowing through cooling air flow path 182 to provide more or less cooling capacity --

Signed and Sealed this
Third Day of April, 2018

Andrei Iancu
*Director of the United States Patent and Trademark Office*